United States Patent [19]

Fisher

[11] Patent Number: 4,463,621
[45] Date of Patent: Aug. 7, 1984

[54] MULTIPLE COUNTERSHAFT AUTOMATIC TRANSMISSION

[75] Inventor: Alan R. Fisher, Dearborn, Mich.

[73] Assignee: Ford Motor Company, Dearborn, Mich.

[21] Appl. No.: 333,847

[22] Filed: Dec. 23, 1981

[51] Int. Cl.³ .................. F16H 3/08; F16D 47/04; F16D 21/02

[52] U.S. Cl. ..................... 74/330; 74/331; 74/356; 192/48.6; 192/48.92; 192/48.8

[58] Field of Search ............... 74/665 B, 330, 337, 74/343, 359, 360, 368, 329, 356, 357, 358; 192/48.9, 3.51, 48.6, 48.92, 48.8

[56] References Cited

U.S. PATENT DOCUMENTS

| | | | |
|---|---|---|---|
| 2,344,656 | 3/1944 | Swennes | 74/330 |
| 2,386,540 | 10/1945 | Campodonico | 74/330 |
| 2,386,541 | 10/1945 | Campodonico | 74/330 |
| 2,403,378 | 7/1946 | Kilpela | 192/48.6 |
| 2,466,318 | 4/1949 | Kohr | 74/330 |
| 2,599,801 | 6/1952 | Youngren et al. | 74/330 |
| 2,612,787 | 10/1952 | Youngren et al. | 74/330 |
| 2,644,340 | 7/1953 | Youngren et al. | 74/330 |
| 2,654,261 | 10/1953 | Youngren et al. | 74/330 |
| 4,106,364 | 8/1978 | Zenker et al. | 74/360 |

OTHER PUBLICATIONS

SAE Paper No. 810104, "A Fully Automatic Vehicle Transmission Using a Layshaft Type Gear Box", by Harry Webster, Feb. 23-27, 1981.

*Primary Examiner*—Lawrence J. Staab
*Assistant Examiner*—Bruce F. Wojciechowski
*Attorney, Agent, or Firm*—Frank G. McKenzie; Donald J. Harrington

[57] ABSTRACT

An automatic transmission has two countershafts, two clutches, an output shaft, two synchronizers, two input shafts adapted to be driven from the crankshaft of an engine through either of the two clutches and a one-way clutch that connects the first gear to the output shaft. The overrunning clutch is continuously driven but is easily overrun when higher gear ratios than the first ratio are selected. Changes of gear ratio result upon alternate engagement and disengagement of the friction clutches. Synchronizer clutches engage the next higher or lower speed ratio than the ratio in which the transmission instantaneously operates.

3 Claims, 4 Drawing Figures

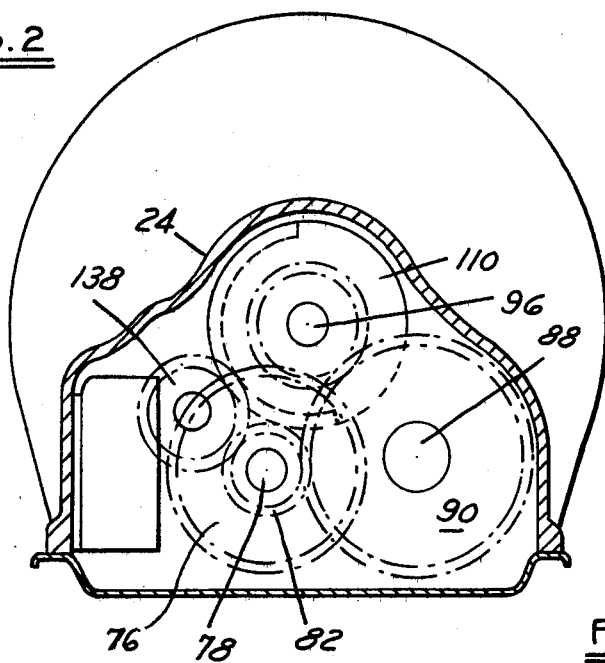
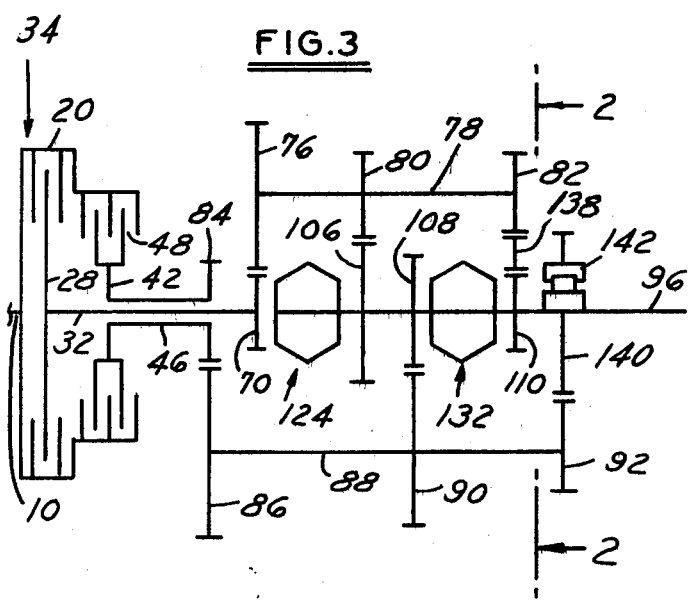

MULTIPLE COUNTERSHAFT AUTOMATIC TRANSMISSION

BACKGROUND OF THE INVENTION

1. Field of the Invention

This invention relates to a multiple speed ratio automatic transmission. More particularly, the invention pertains to such a transmission having multiple countershafts that are selectively coupled to the crankshaft of an engine.

2. Description of the Prior Art

Conventional automatic transmissions whose gear arrangement is of the epicyclic type employ torque converters between the engine crankshaft and the input shaft of the transmission. Torque converters and hydraulic couplings operate with an impeller driven by the engine that produces a toroidal circulation of hydraulic fluid between the impeller and a turbine. The change of momentum of the circulating fluid drives the turbine.

A hydrodynamic torque converter is a device for converting torque, or turning moment, by making use of the kinetic energy of fluid in motion. The impeller imparts a whirling motion to the fluid, a runner is kept rotating by the whirling fluid and the reaction member or turbine changes the direction of the whirling motion between the runner outlet and impeller inlet so that the kinetic energy of the fluid drives the impeller. When starting from rest the efficiency of the torque converter is zero and can range as high as 85-90 percent at the higher speed ratios. Over a considerable portion of its operating range, particularly near its lower speed ratios, the converter operates at less than 40 percent efficiency. Lock-up clutches used in torque converters are capable of improving only slightly the efficiency from the high values to 100 percent in the high-speed ratio range.

The hydraulic control circuitry that produces the multiple speed ratios of the epicyclic automatic transmission is an additional source of power loss since the fluid must be pressurized in order to actuate the clutches and servos that produce the several speed ratios. Furthermore, the hydraulic circuit must continue to be pressurized to positively hold these components while the speed ratios are required.

Heavy vehicles such as trucks that use manual transmissions often require a downshift into a lower speed ratio while the vehicle is attempting to climb a hill. Manual transmissions require that the engine torque be removed from the transmission during the period when the higher speed ratio is disengaged and before the lower speed ratio is engaged. During this time the drivewheels of the vehicle receive no power; consequently, the vehicle loses an appreciable portion of its momentum on a hill. Once momentum is lost the driver often must select the lowest speed ratio of the transmission and creep up the hill while in the lowest speed ratio unless sufficient momentum is regained to sustain the vehicle while an upshift is made. It is preferred that a transmission, whether automatic or manually operated, avoid this period during which the wheels receive no power so that fast engagement of a lower speed ratio can be made. Preferably this advantage can be realized in a transmission that operates more efficiently than a conventional automatic transmission.

It is often required that a stopped vehicle, whose drivewheels have lost frictional contact with the road, be slowly and gently shifted between the first forward ratio and reverse drive in order to clear an obstruction or to regain driving contact with the road surface. Present day manual and automatic transmissions, in order to produce this shifting action, require that the synchronizer clutches, or in the case of an automatic transmission, the clutches and servos that operate to produce the first and reverse drive ratios, be engaged each time the respective gear is selected. It is preferred that this rocking action results merely by preselecting and engaging the transmission components that connect the gear ratio elements to the output shaft and then, by operation of clutches, connect the output shaft through these gears to the crankshaft of the engine.

SUMMARY OF THE INVENTION

In realizing these and other advantages an automatic transmission made according to this invention includes first and second input shafts that are selectively driven from the crankshaft of an engine through first and second clutches. First and second countershafts driven respectively from the input shafts have multiple pinions formed integrally therewith, one countershaft being associated with the odd number gear ratios, the other countershaft being associated with the even numbered gear ratios and the reverse drive ratio. An output shaft carries output gears journalled on its surface which combined with the pinions define multiple pairs of gears that produce the torque delivery paths. One gear of a pair is driveably connected to the output shaft or to its countershaft by an overrunning clutch and in this way establishes a one-way driving connection between the gear and the associated shaft. In order to driveably connect one gear of the multiple pairs of gears to the output shaft, synchronizer clutches are slideably carried on the output shaft for axial shifting movement into engagement with dogteeth formed integrally with the output gears. One forward speed ratio may be a direct drive connection between one of the input shafts and the output shaft, the connection being completed by way of a synchronizer clutch.

BRIEF DESCRIPTION OF THE DRAWINGS

FIG. 2 is a transverse cross section taken at plane 2—2 of FIG. 3.

FIG. 3 is a schematic diagram of the transmission according to this invention.

FIG. 4 is a diagram that illustrates the preselection of adjacent gear ratios and the engagement of the first and second clutches that produce these ratios.

DESCRIPTION OF THE PREFERRED EMBODIMENTS

Figure 1:
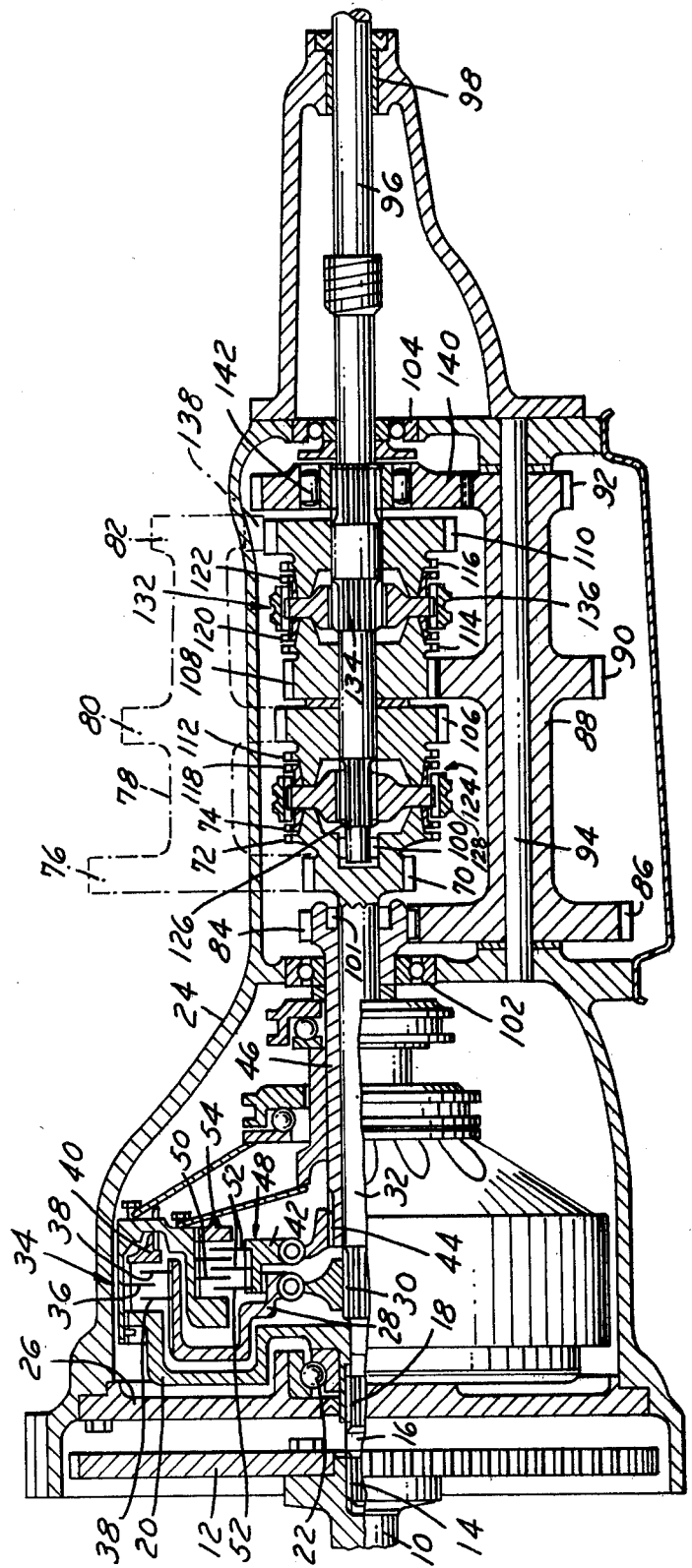
FIG. 1 is a cross section through the longitudinal axis of an automatic transmission according to this invention.

Referring first to FIGS. 1 and 3, the crankshaft 10 of an internal combustion engine with a flywheel 12 bolted to its outer surface is splined at 14 to a quill shaft 16. The quill shaft is splined at 18 to a clutch rotor 20 that is supported by a bearing 22 on the transmission case 24 by way of a circular plate 26. In this way, rotor 20 is driven in rotation by the engine through the quill shaft.

Rotor 20 in combination with a second rotor 28 forms a first clutch that is splined at 30 to a first input shaft 32. Rotor 20 has a first clutch disk 34 splined to its inner surface and located between second and third clutch disks 36, 38 that are splined to rotor 28. A pressure plate 40 that may be hydraulically or pneumatically actuated moves axially into engagement with disk 38 causing a sliding movement of the disks and frictional engagement between the disks of rotors 20 and 28. When plate 40 is actuated in this way, crankshaft 10 is driveably connected to the first input shaft 32.

Rotor 20 and a third rotor 42, which is splined at 44 to a second input shaft 46, define a second clutch 48. Clutch disks 50 are splined to a second interior surface of rotor 20 and are interposed between another set of clutch disks 52 that are splined to the outer surface of rotor 42. When pressure plate 54 is pressurized, its axial movement causes frictional contact to develop between clutch disks 50 and 52. In this way, crankshaft 10 is driveably connected through clutch 48 to the second input shaft 46.

First input shaft 32 has a gear 70 and dogteeth 72 formed thereon and carries a synchronizer ring 74 on a conical surface of the gear. Gear 70 is in continuous meshing engagement with pinion 76, which is formed integrally with a first countershaft 78 as are the second forward speed ratio pinion 80 and the reverse drive pinion 82. The inner end of the second input shaft 46 has a terminal gear 84 formed thereon, which is in continuous meshing engagement with the gear 86 that is integrally formed on a second countershaft 88 as are the third speed ratio pinion 90 and the first forward speed ratio pinion 92. Countershafts 78 and 88 are supported on the transmission casing by support shafts one of which is shown in FIG. 1 at 94.

An output shaft 96 is supported at one end on a bearing 98 fitted within the transmission casing and at the opposite end on a bearing 100 received within a recess formed on the first input shaft 32. Bearing 102 supports input shaft 46 and, by way of bearings 100 and 101, portions of the output shaft 96 and the first input shaft 32, respectively. Bearing 104 provides further rotational support for the output shaft.

Journalled on the output shaft are a second speed ratio gear 106 which is in continuous engagement with pinion 80, a third speed ratio gear 108, which is in continuous engagement with pinion 90, and a reverse drive gear 110. Gears 106, 108, 110 have dogteeth wheels 112, 114, 116 formed integrally and respectively therewith. Gears 106, 108, 110 provide conical surfaces on which synchronizer clutch rings 118, 120, 122 are supported.

A first synchronizer clutch 124 is supported by a spline 126 on the output shaft 96. The hub of the synchronizer supports a synchronizer clutch sleeve 128 on a spline permitting axial sliding motion of the sleeve into engagement with the dogteeth 72, 74, when moved in one axial direction, and dogteeth 118, 112 when moved in the opposite axial direction. This engagement of the dogteeth by the clutch sleeve spline driveably connects either gear 70 or gear 106 to the output shaft 96 through the spline 126. A second synchronizer clutch 132 has a hub that is splined at 134 to output shaft 96 and supports synchronizer clutch sleeve 136 that is moveable into engagement with dogteeth 114 and 120, when moved in one axial direction, and with dogteeth 116 and 122 when moved in the opposite axial direction. When clutch sleeve 136 is moved forward, gear 108 is driveably connected to the output shaft and when the clutch sleeve 136 is moved rearward gear 110 is driveably connected to the output shaft.

As can be seen in FIG. 2 a reverse idler 138 is mounted for rotation and continuous meshing engagement with reverse pinion 82 and reverse output gear 110.

The first forward speed ratio pinion 92 is in continuous engagement with the first forward speed ratio output gear 140. Gear 140 is driveably connected to the output shaft 96 by an overrunning clutch 142 whereby a one-way driving connection between gear 140 and shaft 96 is established.

FIG. 4 shows the sequence for preselecting the output gears and for engaging and disengaging clutches 34 and 48 necessary to produce the speed ratios of which the transmission is capable. The first speed ratio is produced when clutch 48 is engaged, clutch 34 is disengaged, the 2-4 synchronizer 124 is in its neutral position and synchronizer 132 is moved rearward to engage reverse gear 110. The torque delivery path from the crankshaft 10 includes second input shaft 46, second countershaft 88, first speed ratio pinion 92, overrunning clutch 142, output gear 140 and the output shaft 96. With the transmission so disposed and with the 3-R synchronizer clutch 132 engaged with reverse output gear 110, the transmission can be shifted from the first forward speed ratio to reverse drive ratio by merely disengaging clutch 48 and applying clutch 34. Then by disengaging clutch 34 and engaging clutch 48 output shaft 96 is again driven at the first speed ratio. This preselection of reverse drive by shifting synchronizer 132 forward would be permitted by the control system only when the vehicle is stationary.

When acceleration in the forward direction is required from the first speed ratio, synchronizer 132 disengages reverse gear and returns to its neutral position and synchronizer 124 engages second gear 106 driveably connecting it to the output shaft. A shift from first speed ratio to the second speed ratio results when clutch 48 is disengaged and clutch 34 is engaged. The torque delivery path for the second speed ratio includes first input shaft 32, first countershaft 78, pinion 80, gear 106, synchronizer 124 and output shaft 96. The overrunning clutch 142 overruns following a shift from the first speed ratio to the second speed ratio.

The change of speed ratio between second and third speed ratios results upon movement of synchronizer 132 from its neutral position into engagement with third gear 108 thereby connecting it to the output shaft 96. When this is accomplished, clutch 34 is disengaged and clutch 48 is applied. The torque delivery path for the third speed ratio, therefore, includes second input shaft 46, second countershaft 88, pinion 90, third gear 108, synchronizer 132 and output shaft 96. One-way clutch 142 continues to overrun when the transmission is disposed for third speed ratio operation. Therefore, the first speed ratio gear 140 transmits no power to the output shaft.

A shift from the third speed ratio into fourth speed ratio occurs upon movement of synchronizer clutch 124 out of engagement with gear 106 and into engagement with gear 70. Next, clutch 48 is disengaged and clutch 34 is engaged. This causes a direct drive connection between crankshaft 10 and output shaft 96 through clutch 34 and the first input shaft 32.

While operating in fourth gear, synchronizer clutch 132 remains engaged with the third speed gear 108. A downshift from the fourth speed ratio to the third speed ratio results upon disengagement of clutch 34 and application of clutch 48. Next, synchronizer clutch 124 is shifted rearward disengaging fourth gear 70 and engaging the second gear 106. Then clutch 34 is disengaged and clutch 48 applied. A downshift from third speed ratio to second speed ratio results upon disengagement of clutch 48 and the application of clutch 34. Immediately following this action synchronizer 132 disengages third gear 108 and returns to its neutral position. A downshift from the second speed ratio to the first speed ratio is accomplished by disengaging clutch 34 and applying clutch 48. When this transfer of clutch engagement is accomplished, synchronizer 132 is moved into engagement with the reverse gear 110.

An alternate method for downshifting from fourth gear directly to first gear is to disengage clutch 34, move synchronizer 124 rightward out of engagement with gear 70, and engage clutch 48. Overrunning clutch 142 will not drive shaft 96 until the vehicle has slowed sufficiently so that shaft 96 turns at the speed of gear 140. In this way, the objectable coast torque sensation during the downshift is avoided. If the engine speed increases upon reacceleration, shaft 96 is driven by gear 140 through clutch 48. If the vehicle is brought to a full stop, clutch 48 is disengaged.

Having described the preferred embodiment of my invention, what I claim and desire to secure by U.S. Letters Patents is:

1. A multiple speed ratio transmission comprising:
   first and second input shafts driven from the crankshaft of an engine the first input shaft having a gear fixed thereto;
   first clutch means for selectively producing a driving connection between the engine crankshaft and the first input shaft;
   second clutch means for selectively producing a driving connection between the engine crankshaft and the second input shaft;
   a first countershaft driven by the gear of the first input shaft upon engagement of the first clutch means, having pinions fixed thereto that form a portion of the second forward speed ratio and reverse drive torque paths;
   a second countershaft driven by the second input shaft upon engagement of the second clutch means, having pinions fixed thereto that form a portion of the first and third forward speed ratios;
   an output shaft having gears carried thereon that form another portion of the second and third forward speed ratio and reverse drive torque paths, said forward speed ratio gears being in continuous engagement with the pinions on the crankshafts that form a portion of the second and third forward speed ratio torque paths;
   a first forward speed ratio gear carried by the output shaft and driveably connected thereto by an overrunning clutch whereby a one-way driving connection is made therebetween, the first speed ratio gear being in continous engagement with the first speed ratio pinion;
   synchronizer clutch means carried by the output shaft for selectively driveably connecting to the output shaft the gear that is fixed to the first input shaft, and the second and third forward speed ratio gears and reverse drive gear that are carried on the output shaft; and
   a reverse drive idler continously engaged with the reverse gear and reverse pinion.

2. The transmission of claim 1 wherein the synchronizer clutch means include a first synchronizer clutch adapted to driveably connect to the output shaft the gear that is fixed to the first input shaft and the second speed ratio gear that is carried by the output shaft, and a second synchronizer clutch adapted to driveably connect to the output shaft the third speed ratio gear and the reverse drive gears that are carried by the output shaft.

3. The method for changing the forward and reverse drive ratios of a multiple speed ratio transmission having a first input shaft adapted to be connected by a first clutch to a power source and to drive a first countershaft having a reverse pinion fixed thereto, a second input shaft adapted to be connected by a second clutch to a power source and to drive a second countershaft having a first speed ratio pinion fixed thereto, an output shaft having a synchronizer clutch carried thereon adapted to driveably connect a reverse drive gear thereto, the reverse gear being driven by a reverse idler engaged with the reverse pinion and reverse gear, the output shaft having a first speed ratio gear engaged with the first speed ratio pinion connected thereto through an overrunning clutch that establishes a one-way driving connection between the output shaft and first speed gear comprising:
   shifting the synchronizer clutch into engagement with the reverse drive gear thereby connecting the output shaft to the reverse gear; and
   alternately engaging the first clutch and disengaging the second clutch, and engaging the second clutch and disengaging the first clutch whereby the output shaft is driven alternately at the first forward speed ratio and at the reverse drive ratio.

* * * * *